(12) United States Patent
Hiruma et al.

(10) Patent No.: US 7,713,593 B2
(45) Date of Patent: May 11, 2010

(54) SURFACE TREATMENT METHOD, MANUFACTURING METHOD OF COLOR FILTER SUBSTRATE, AND MANUFACTURING METHOD OF ELECTRO-OPTICAL DEVICE

(75) Inventors: Kei Hiruma, Chino (JP); Katsuhiro Takahashi, Shiojiri (JP)

(73) Assignee: Seiko Epson Corporation (JP)

( * ) Notice: Subject to any disclaimer, the term of this patent is extended or adjusted under 35 U.S.C. 154(b) by 918 days.

(21) Appl. No.: 11/424,957

(22) Filed: Jun. 19, 2006

(65) Prior Publication Data

US 2007/0199919 A1    Aug. 30, 2007

(30) Foreign Application Priority Data

Jun. 20, 2005   (JP) ............................. 2005-178969

(51) Int. Cl.
*H05H 1/22* (2006.01)
(52) U.S. Cl. ..................................... 427/535; 427/255.5
(58) Field of Classification Search ................ 427/535, 427/237
See application file for complete search history.

(56) References Cited

U.S. PATENT DOCUMENTS 5,882,468 A * 3/1999 Crockett et al. .......... 156/345.3

FOREIGN PATENT DOCUMENTS

| JP | 63-155546 | 6/1988 |
| JP | 09-246251 | 9/1997 |
| JP | 2001-267251 | 9/2001 |
| JP | 2002-217174 | 8/2002 |
| JP | 2002359203 A | * 12/2002 |
| JP | 2003-257648 | 9/2003 |
| JP | 2003-272837 | 9/2003 |
| JP | 2004-010994 | 1/2004 |
| JP | 2005-002417 | 1/2005 |
| KR | 2002-0085321 | 11/2002 |

* cited by examiner

*Primary Examiner*—Roberts Culbert
(74) *Attorney, Agent, or Firm*—Harness, Dickey & Pierce, P.L.C.

(57) ABSTRACT

A surface treatment method using a plasma treatment apparatus which has an electric discharge generation portion facing a surface of a substrate with a gap therebetween, the substrate being placed on a supporting body, and a construction in which the gap is supplied with a treatment gas, the method includes: applying different voltages between the electric discharge generation portion and the supporting body such that plasma is obtained from the treatment gas supplied to the gap; moving one of the electric discharge generation portion and the substrate relative to the other in a first direction, while the surface of the substrate being exposed to the plasma; and moving, after the relative movement in the first direction and the exposure above referenced, one of the electric discharge generation portion and the substrate relative to the other in a second direction opposite to the first direction, while the surface of the substrate being exposed to the plasma.

2 Claims, 6 Drawing Sheets

US 7,713,593 B2

SURFACE TREATMENT METHOD, MANUFACTURING METHOD OF COLOR FILTER SUBSTRATE, AND MANUFACTURING METHOD OF ELECTRO-OPTICAL DEVICE

BACKGROUND

1. Technical Field

The present invention relates to a surface treatment method, and particularly to a surface treatment method which is preferably applied to manufacturing of a color filter substrate by an ink-jet process, and manufacturing of an electro-optical device by an ink-jet process.

2. Related Art

There has been known that an alignment film is formed on a surface of a substrate by an ink-jet process. In the ink-jet process, before an alignment film forming process, a process of adjusting wettability of a substrate surface as a base of an alignment film is performed. An atmospheric-pressure plasma method is one technique used in the process of adjusting wettability of the substrate surface. By the atmospheric-pressure plasma method, the substrate surface is exposed to excited radicals or plasma under atmospheric pressure to adjust surface energy or wettability of the substrate surface.

The example describes a plasma treatment apparatus which supply the substrate surface with excited radicals uniformly. According to the example, a treatment gas is introduced to an electric discharge region between a porous plate i.e. an electrode and a substrate surface through the porous plate as the electrode. Further according to the example, due to a function of the porous plate, the same electric discharge state is attained at the surface anywhere in the electric discharge region. As a result, the degree of the process the substrate surface undergoes becomes uniform across the entire surface.

JP-A-2003-272837 (FIG. 1 to FIG. 3) is an example of related art.

The porous plate of the example has many holes through which the treatment gas passes. Because of this, the porous plate tends to be decomposed by the treatment gas. Furthermore, when the porous plate is decomposed, thereby substances are generated and adhere to the substrate surface as impurities, causing a fear of deteriorating of a panel.

Moreover, the present inventor has found that when the electrode is caused to move relative to the surface continuously, unevenness in processing is possible to be generated, even if the porous plate is used.

SUMMARY

An advantage of some aspects of the invention is to provide a method of conducting a plasma treatment across the entire surface uniformly and efficiently.

According to an aspect of the invention, a surface treatment method uses a plasma treatment apparatus which has an electric discharge generation portion facing a surface of a substrate with a gap therebetween, the substrate being placed on a supporting body, and a construction in which the gap is supplied with a treatment gas. The surface treatment method includes: applying different voltages between the electric discharge generation portion and the supporting body such that plasma is obtained from the treatment gas supplied to the gap; moving one of the electric discharge generation portion and the substrate relative to the other in a first direction, while the surface of the substrate being exposed to the plasma; and moving, after the relative movement in the first direction and the exposure above-referenced, one of the electric discharge generation portion and the substrate relative to the other in a second direction opposite to the first direction, while the surface of the substrate being exposed to the plasma.

In accordance with the above aspect of the invention, one of the electric discharge generation portion and the substrate is caused to move relative to the other in the first direction, while the substrate is exposed to the plasma. Further, before or after this process, one of the electric discharge generation portion and the substrate is caused to move relative to the other in the second direction opposite to the first direction, while the substrate is exposed to the plasma. In this case, since such a "two-way process" is performed, the degree of the plasma treatment the substrate surface undergoes may be maintained at high level, when the substrate is caused to move at a higher speed relative to the electric discharge generation portion. Further, in this case, since a "two-way process" is performed, even if irregularity exists along a direction of the relative movement on the surface the electric discharge generation portion faces, it may be possible to restrain unevenness in processing on the substrate due to the irregularity from generating.

It is preferable that the surface treatment method further include exposing the substrate to atmospheric air when the treatment gas contains oxygen, between the process of the relative movement in the first direction and the exposure, and the process of the relative movement in the second direction and the exposure. In this case, the substrate surface may be effectively imparted affinity with water.

Furthermore, the aspects of the invention may be realized by various kinds of modes, specifically, by a mode of a manufacturing method of a color filter, or a mode of a manufacturing method of an electro-optical device. Here, a term "electro-optical device" includes at least a liquid crystal display device, a plasma display device, an organic electroluminescence display device, a surface-electron emitting display (SED), and a field emission display (FED). In addition, the "electro-optical device" refers to all kinds of display device devices that project, emit, transmit or reflect light upon application of a signal voltage, not limited to devices which utilize changes in optical characteristics (so-called electro-optical effects), such as birefringence change, optical rotation change and light scattering change.

BRIEF DESCRIPTION OF THE DRAWINGS

The invention will be described with reference to the accompanying drawings, wherein like numbers reference like elements.

DESCRIPTION OF EXEMPLARY EMBODIMENTS

The surface treatment method according to one embodiment of the invention is realized as a part of an alignment film forming process of a liquid crystal display device by an ink-jet process in the embodiment. In other words, the embodiment of the invention is realized as a manufacturing method of a liquid crystal display device.

A. Whole Construction of Plasma Treatment Apparatus

Figure 1:
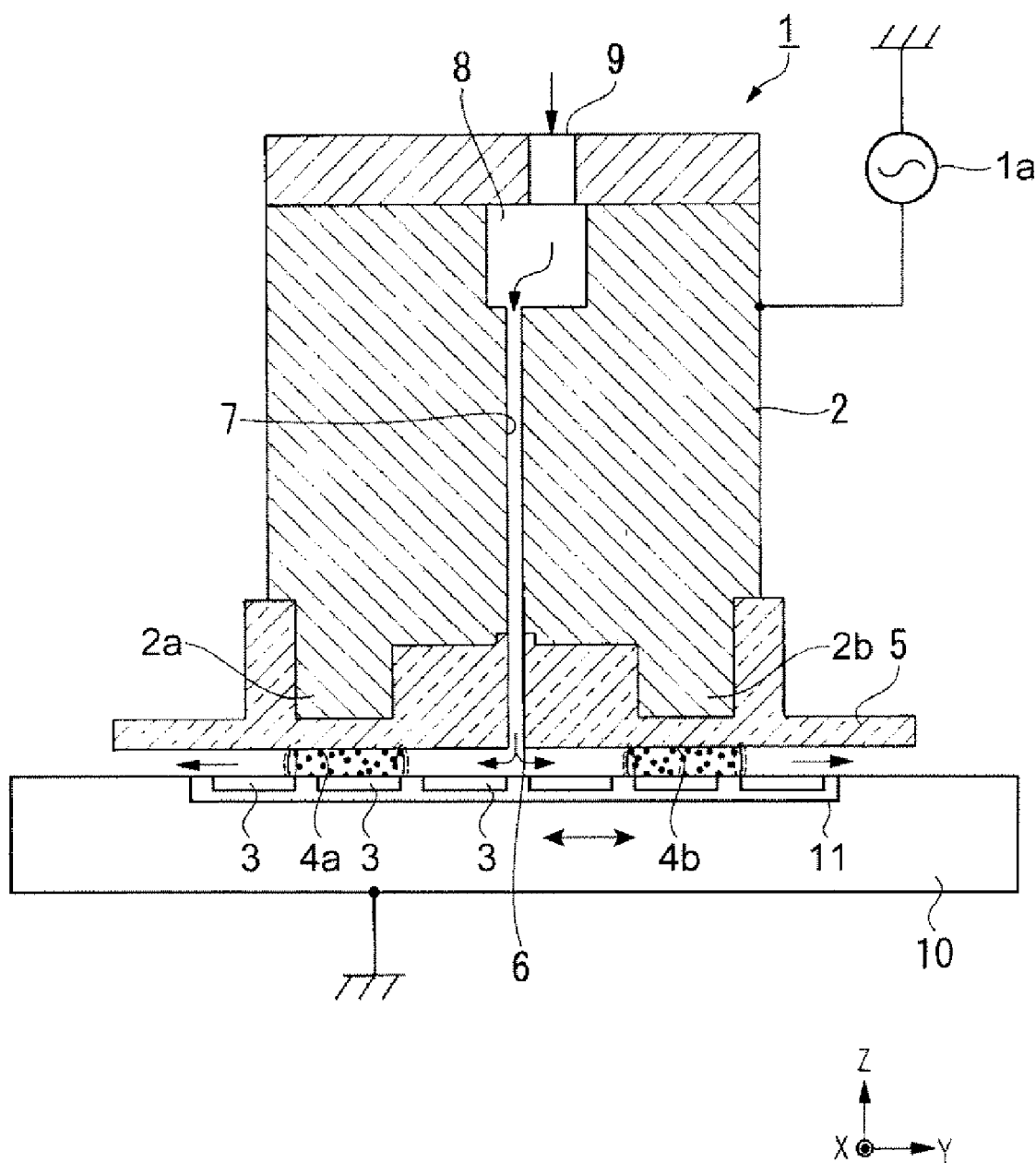
FIG. 1 is a schematic view showing a plasma treatment apparatus of the embodiment.

A plasma treatment apparatus 1 in FIG. 1 is an apparatus of performing a plasma treatment under atmospheric pressure, and is used in a surface treatment method of the embodiment. The plasma treatment apparatus 1 is provided with an AC power supply 1a, an electrode 2 connected to the AC power supply 1a, a dielectric member 5, a stage 10 functioning as a ground electrode with respect to the electrode 2. The electrode 2 has two projecting portions 2a and 2b projecting from a main body thereof toward the stage 10 side. The two projecting portions 2a and 2b have a shape extending to an X axis direction, respectively.

The dielectric member 5 covers the bottom and side surfaces of the electrode 2. Note that the dielectric member 5 has a thickness above the two projecting portions 2a and 2b respectively smaller than that of the other potions on the electrode 2. In the embodiment, the two projecting portions 2a and 2b, and the dielectric member 5 positioned thereon correspond to two electric discharge generation portions 4a and 4b. Further, the two electric discharge generation portions 4a and 4b have a shape extending to the X axis direction respectively similar to the two projecting portions 2a and 2b. The two electric discharge generation portions 4a and 4b have a plane bottom surface, respectively. Note that the two electric discharge generation portions 4a and 4b have the dielectric member 5 covering the two projecting portions 2a and 2b, therefore the two electric discharge generation portions 4a and 4b respectively are prevented from generating an abnormal electrical discharge.

The stage 10 is an electric conductor made of aluminum. The stage 10 is constituted so as to move back and forth with a pallet 11 mounted thereon along a Y axis direction perpendicular to the X axis direction. As described later, a plurality of substrates 3 are placed on the pallet 11. The two electric discharge generation portions 4a and 4, and the stage 10 are aligned such that the two electric discharge generation portions 4a and 4b respectively face the surfaces of the substrates 3 on the pallet 11 with a discharge gap DG (FIG. 3) therebetween. Note that, in the embodiment, a length of the discharge gap DG between each of the two electric discharge generation portions 4a and 4b, and the surfaces of substrates 3 is about 0.5 mm.

Here, a gas ejection port 6 is positioned, which has a shape elongated in the X axis direction, between the two electric discharge generation portions 4a and 4b. The gas ejection port 6 is connected to a gas introduction port 9 via a gas passage 7 and an intermediate chamber 8 passing through the inside of the dielectric member 5 and the electrode 2 along a Z axis direction. The plasma treatment apparatus 1 can supply the discharge gap DG with a mixture gas owing to such a construction.

The mixture gas ejected from the gas ejection port 6 is divided into forward and backward directions, and flows in a space between the dielectric member 5 and the stage 10 along a relative movement direction (Y axis direction), and reaches two electric discharge regions respectively Here, the "electric discharge region" is a space corresponding to each of the two electric discharge generation portions 4a and 4b. It should be understood that the stage 10 has a pair of walls facing to each other positioned at both sides thereof, not illustrated, so that the mixture gas ejected to the space between the dielectric member 5 and the stage 10 dose not leak in the X axis direction. In addition, the pair of walls play a role of supporting the dielectric member 5 and the electrode 2 in order to retain the space between the dielectric member 5 and the stage 10.

The mixture gas, after passing through the two electric discharge regions respectively, is exhausted outside the plasma treatment apparatus 1 from a fore end and a rear end of the dielectric member 5. In parallel with such supply of the mixture gas, when a predetermined voltage is applied from the AC power supply 1a to the electrode 2, gaseous electric discharge is generated in the two electric discharge regions. Due to the gaseous electric discharge, plasma or excited radicals are generated from a treatment gas, described later, in the mixture gas. Accordingly, the surfaces of the substrates 3 are exposed to such plasma or excited radicals and processed in the two electric discharge regions respectively. Furthermore, since the two electric discharge regions respectively move on the substrates 3 continuously according to the relative movement of the stage 10, the entire surfaces of the substrates 3 are exposed continuously to the plasma or the excited radicals and processed. Note that such a manner of the surface treatment that the plasma treatment apparatus 1 performs is called a "direct type".

Generally, the mixture gas described above is obtained by mixing a treatment gas such as oxygen ($O_2$) and carbon tetrafluoride (CF4) suitable to an intended surface treatment, and an inert gas such as helium (He), argon (Ar), and nitrogen ($N_2$) for starting easily the gaseous electric discharge under a pressure near the atmospheric pressure and maintaining the stability thereof By selecting the treatment gas properly, various kinds of surface treatments are performed such as etching, ashing, modification, and film formation with respect to the surface. Particularly, by using oxygen as the treatment gas, the surface is imparted affinity with liquid and the work function of this electrode of an organic EL device is adjusted.

According to the surface treatment method of the embodiment, the surface of the substrate 3 is imparted affinity with liquid. For this purpose, the treatment gas contains oxygen ($O_2$).

B. Pallet

Figure 2:
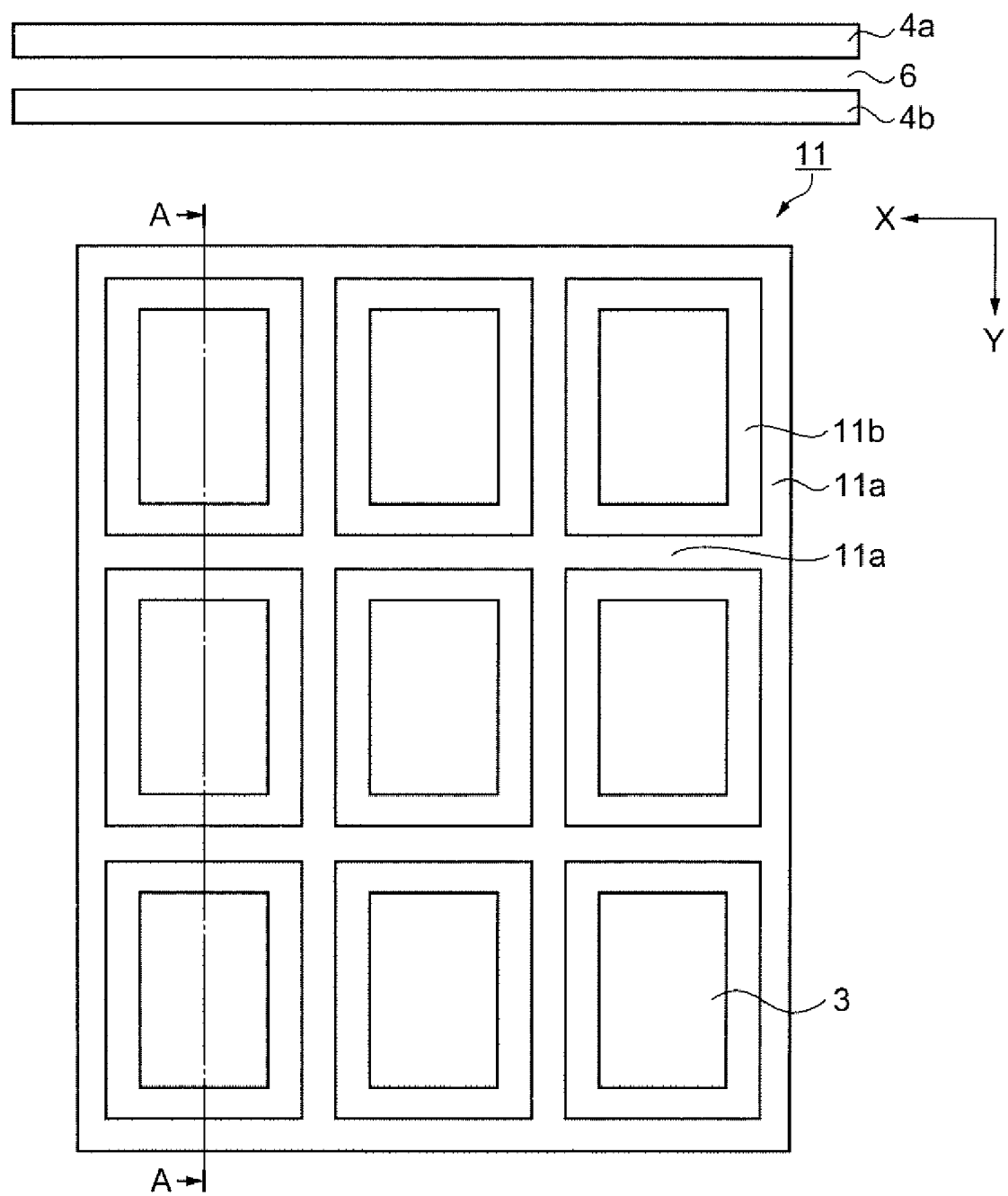
FIG. 2 is a schematic view showing a plan of a pallet.
Figure 3:
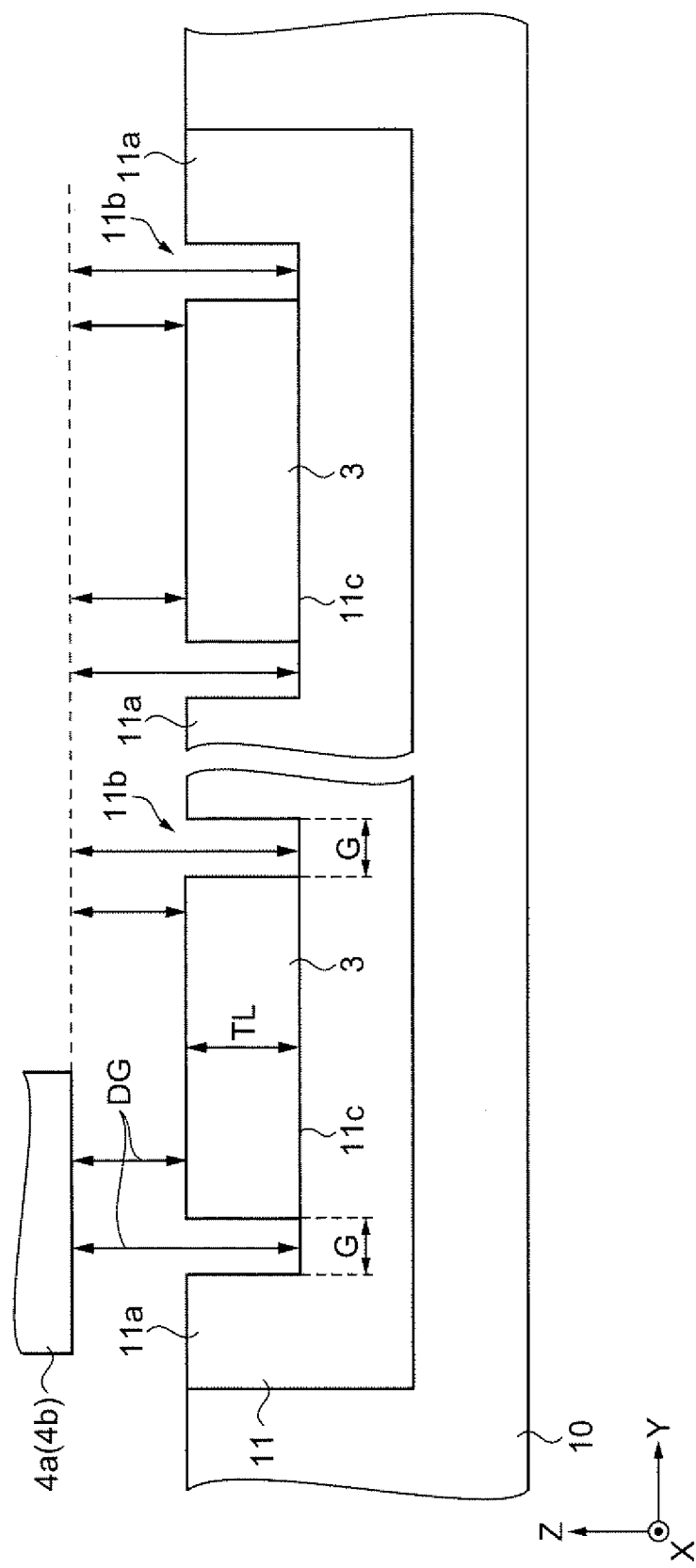
FIG. 3 is a schematic view showing a cross-section taken along the line A-A of FIG. 2.

FIG. 2 and FIG. 3 show the pallet 11 arranged on the stage 10. FIG. 3 corresponds to a cross section taken along the line A-A of FIG. 2. The pallet 11 of the embodiment is the electric conductor and made of aluminum. The pallet 11 has such a constitution that a plurality of substrates 3 are placed thereon. Specifically, the pallet 11 has a plurality of ribs 11a, and a plurality of recess portions 11b surrounded by the plurality of ribs 11a. Each of the plurality of recess portions 11b has a plane bottom surface 11c, on which each of plurality of substrates 3 is to be set. When the substrate 3 is placed on the pallet 11, the substrate 3 is oriented to have the surface to be processed directed upward in the recess portion 11b.

As shown in FIG. 3, the substrate 3 has a thickness TL. Accordingly, a depth of the recess portion 11b and the thickness TL of the substrate 3 are set to be equal to each other so that when the substrate 3 is set in the recess portion 11b, the upper surface of the rib 11a and the surface of substrate 3 are positioned approximately at the same level or height. On the other hand, a gap G presents between the side surface of the recess portion 11b and the substrate 3. Due to the presence of the gap G, an operator can set easily the substrate 3 in the recess portion 11b, as well as can take out easily the substrate 3 from the recess portion 11b.

Meanwhile, in a case there is no pallet 11 on the stage 10, the plasma treatment apparatus 1 can process the surface of the substrate 3 with the substrate 3 being placed directly on the stage 10. However, if the pallet 11 is used, a plurality of substrates 3 can be set in the plasma treatment apparatus 1 at one time, and a plurality of substrates 3 can be taken out from the plasma treatment apparatus 1 at one time. Therefore, if a plurality of substrates 3 are placed on each of the plurality of pallets 11, a number of surfaces of the substrates 3 can be processed by only replacing the pallet 11 with respect to the plasma treatment apparatus 1. That is, time efficiency is improved. Further, when the pallet 11 is used, the upper surface of the rib 11a as the electric conductor is aligned with a position which is between two substrates 3 adjacent to each other and has the same height as the surface of the substrate 3. Therefore, the gaseous electric discharge is likely to generate across the plurality of substrates 3.

Note that when the surface of substrate 3 is processed using the pallet 11, a combination of the pallet 11 and the stage 10 is an example of a "supporting body" of the embodiment of the invention. However, in a case of not using the pallet 11, that is, in a case that the substrate 3 is placed on the stage 10, the stage 10 corresponds singularly to a "supporting body" of the embodiment of the invention.

The substrate 3 is illustrated in a simplified manner in FIG. 1 to FIG. 3. However, the substrate 3 is actually an active matrix substrate provided with at least a plurality of switching elements and a plurality of pixel electrodes electrically connected to the plurality of switching elements. Specifically, the substrate 3 of the embodiment has a shape of chip sized 0.7 inch. The chip is subjected to the surface treatment of the embodiment, and thereafter, formed with an alignment film, an opposite substrate, and a liquid crystal layer thereon, and made into a liquid crystal display device or a liquid crystal light valve.

However, in another embodiment, the substrate 3 may be an opposite substrate provided with an opposite electrode. In still another embodiment, the substrate 3 may be a simple substrate as illustrated in FIG. 1 to FIG. 3. Nevertheless, "the surface of the substrate 3" described above may be surfaces of a plurality of pixel electrodes, a surface of an opposite electrode, and a surface of an insulating film positioning as a base of a plurality of pixel electrodes or a base of an opposite electrode.

C. Alignment Film Material

As described above, the surface treatment method of the embodiment is realized as a part of an ink-jet process. Specifically, the surface of the substrate 3 is subjected to the surface treatment, described later, and thereafter, is applied with a functional liquid containing alignment film material by using a liquid droplet discharging apparatus such as an ink-jet apparatus. Note that in another embodiment, the surface treatment method of the embodiment of the invention may be realized as a part of another known print process instead of the ink-jet process.

The functional liquid of the embodiment contains polyamide as the alignment film material, and γ butyrolactone as a solvent for dissolving polyamide. Polyamide is contained about 2% by weight of γ butyrolactone in the solvent.

D. Surface Treatment Method

Figure 4A:
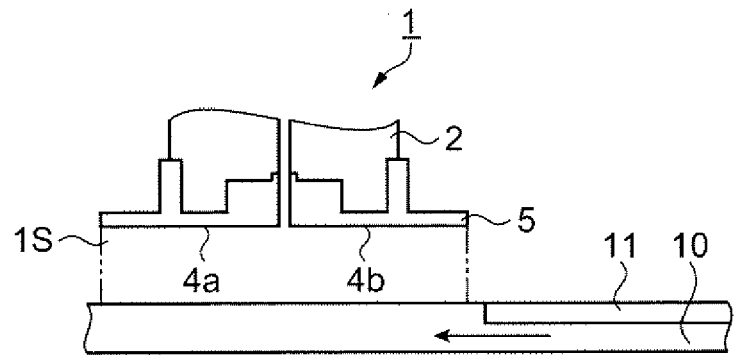
FIGS. 4A to FIG. 4D are views showing a surface treatment method of the embodiment.

The surface treatment method of the embodiment is explained with reference to FIGS. 4A to 4D. First, as shown in FIG. 4A, the stage 10 is set such that the surfaces of the substrates 3 (FIG. 1) placed on the pallet 11 is positioned outside a shadow area 1S, described later. Then, the mixture gas is supplied to a space between the two electric discharge generation portions 4a and 4b, and the stage 10. Further, different voltages are applied between each of the two electric discharge generation portions 4a and 4b, and the stage 10. As a result, gaseous electric discharge is generated in the electric discharge regions described above, and plasma can be obtained from the treatment gas in the mixture gas. In the embodiment, the gaseous electric discharge is generated by a plasma power of 550 w.

Figure 4B:
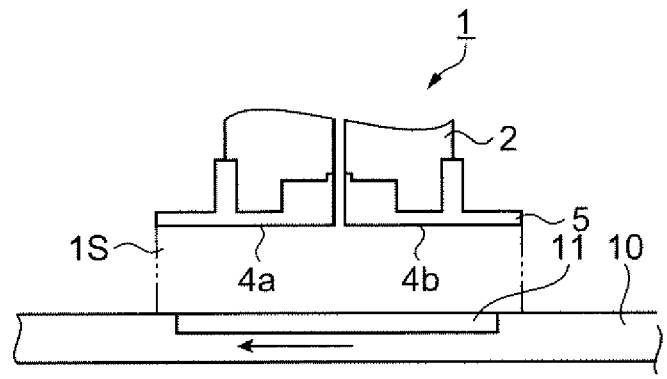

Then, as shown in FIG. 4B, the substrates 3 are caused to move backward relative to the two electric discharge generation portions 4a and 4b along the Y axis direction. In the embodiment, the relative movement is continued from when the surfaces of the substrates 3 enter the shadow area 1S until they exit from the shadow area 1S completely. Therefore, the surfaces of the substrates 3 entirely are exposed to the plasma.

Figure 4C:
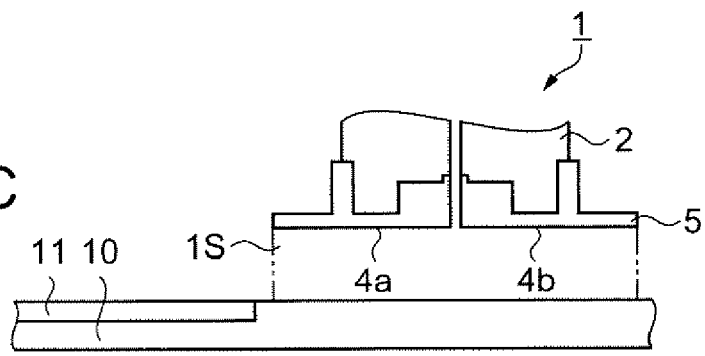

Next, as shown in FIG. 4C, the surfaces the substrates 3 are exposed to atmospheric air. The surfaces the substrates 3 may be exposed to an atmosphere of such low concentration of the mixture gas that can be ignored, replaced with atmospheric air. In the embodiment, the substrates 3 are taken out completely from the shadow area 1S, thereby, it is realized that the substrates 3 are exposed to atmospheric air. Here, the "shadow area 1S" means a range obtained by projecting the plasma treatment apparatus 1 on the stage 10 side along the Z axis direction.

Figure 4D:
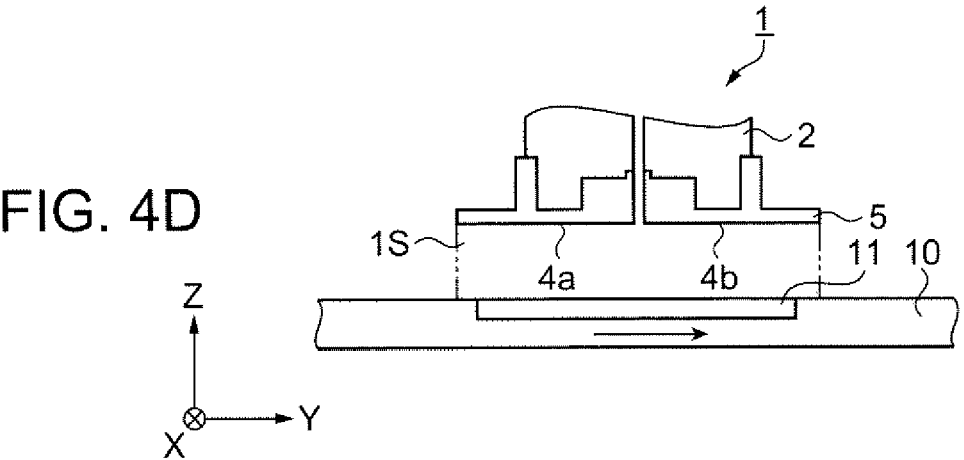

Then, as shown in FIG. 4D, the substrates 3 are caused to move forward relative to the two electric discharge generation portions 4a and 4b along the Y axis direction. The relative movement is continued from when the surfaces of the substrates 3 enter again the shadow area 1S until they exit from the shadow area 1S completely. Therefore, the surfaces of the substrates 3 entirely are exposed to the plasma again.

As described so far, in the embodiment, while exposing the surfaces of the substrates 3 to the plasma, firstly the substrates 3 are caused to move relatively backward. Thereby, organic substance present on the surfaces of the substrates 3 is decomposed by the plasma. The organic substance is decomposed by the plasma to form water ($H_2O$) or carbon dioxide ($CO_2$), which is removed from the surfaces of the substrates 3. Therefore, the surfaces of the substrates 3 are washed. Next, the washed surfaces of the substrates 3 are exposed to atmospheric air. By doing this, the surfaces of the substrates 3 are covered with radical oxygen released from water molecules in atmospheric air. Then, while again the surfaces of the substrates 3 are exposed to the plasma, the substrates 3 are caused to move relatively forward. The surfaces of the substrates 3, which are exposed again to the plasma after exposed to atmospheric air, are efficiently imparted affinity with liquid. Furthermore, since the relative movement directions of two times are different to each other, unevenness in processing is reduced.

Here, in the specification, the process is also referred to as a "two-way treatment", in which one of the electric discharge generation portion 4a (4b) and the substrate 3 is caused to move relative to the other both forward and backward while the surfaces of the substrates 3 being exposed to the plasma. In addition, the process is also referred to as a "one-way treatment", in which one of the electric discharge generation portion 4a (4b) and the substrate 3 is caused to move relative to the other only either forward or backward.

E. Variation of Contact Angle

Distribution of contact angles on the surfaces of the substrates 3 was measured, after the surfaces of the substrates 3 were processed according to the surface treatment method described above. Measurement method and result are as in the following.

Figure 5A:
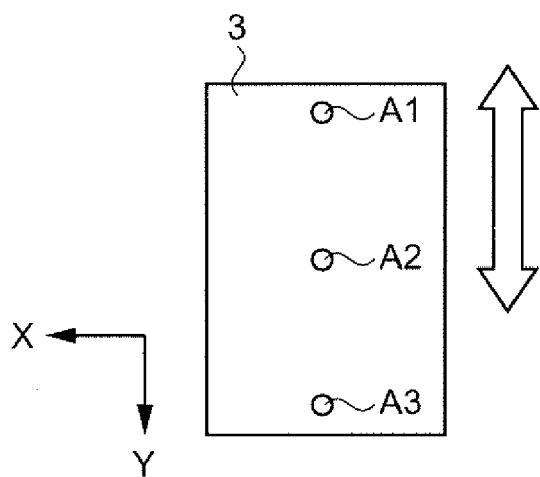
FIG. 5A is a view showing three measurement positions on a substrate surface.

As shown in FIG. 5A, three measurement positions A1, A2 and A3 were set on each of the substrates 3 in order to investigate distribution of the contact angles on the surfaces of the substrates 3. The three measurement positions A1, A2 and A3 were aligned in the Y axis direction. Among these, the measurement positions A1 and A3 were both positioned on the end portion of the substrate 3. In contrast, the measurement position A2 was positioned between the measurement positions A1 and A3, and in the embodiment, positioned approximately on the center portion of the substrate 3.

Then, the two-way process and the one-way treatment were conducted for each of the substrates 3. The two-way process or the one-way treatment was started. The electric discharge generation portion 4a (4b) faced firstly the measurement positions A3, A2 and A1 in this order. In the case of the two-way process, after that, the electric discharge generation portion 4a (4b) further faced the measurement positions A1, A2 and A3 in this order again.

Figure 5B:
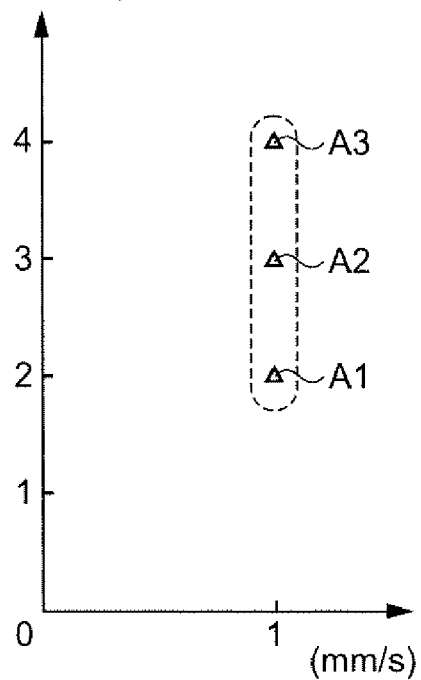
FIG. 5B is a graph showing contact angles of three measurement positions respectively in a case of a one-way treatment.
Figure 5C:
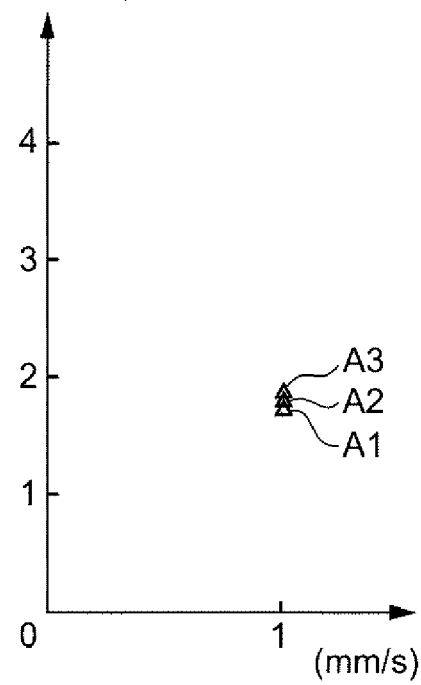
FIG. 5C is a graph showing contact angles of three measurement positions respectively in a case of a two-way process.

After the two-way process and the one-way treatment respectively were completed, the contact angles of the measurement positions A1, A2 and A3 of each of the substrates 3 were measured. The contact angle was measured with respect to the functional liquid described above applied to the surface of the substrate 3. FIG. 5B is a graph showing the distribution of the contact angles in the case of applying the one-way treatment to the substrate 3. FIG. 5C is a graph showing the distribution of the contact angles in the case of applying the two-way treatment to the substrate 3. As shown in FIG. 5B, in the case of the one-way treatment, each contact angle of the measurement positions A1, A2 and A3 was distributed in a range from 2 degrees to 4 degrees. On the other hand, as shown in FIG. 5C, in the case of the two-way process, each contact angle of the measurement positions A1, A2 and A3 was within a range of less than 2 degrees, and variation between them was small.

As shown in the measurement result above, in the surface treatment method of the embodiment, applying the two-way process to the substrates 3 reduces unevenness in processing across the entire surfaces of the substrates 3. Therefore, when the functional liquid is applied to the substrate 3 for which the two-way process has been conducted, the functional liquid wettably spreads across the entire surface of the substrate 3 uniformly. For this reason, if the functional liquid contains alignment film material, an alignment film having a uniform thickness across the entire surface of the substrate 3 can be obtained.

One of reasons why unevenness in processing is reduced by conducting the two-way process is as follows. Table 1 shows the changes of the surface treatment result corresponding to the changes of the discharge gap DG in cases of the plasma power of 300 w, 400 w, and 500 w, respectively. In any cases, the surface treatment result was obtained from an observation at the identical position on each substrate 3.

TABLE 1

| Power | Gap | | | | | |
|---|---|---|---|---|---|---|
| | 0.5 mm | 0.6 mm | 0.7 mm | 0.8 mm | 0.9 mm | 1.0 mm |
| 300 w | ○ | Δ | x | x | x | x |
| 400 w | ○ | ○ | Δ-x | x | x | x |
| 550 w | ○ | ○ | ○ | Δ | Δ | x |

In Table 1, "○" indicates that the result of the surface treatment is good, "Δ" indicates that the result of the surface treatment is not sufficient, and "x" indicates that the surface treatment was not conducted.

As shown in Table 1, a sufficient result of the surface treatment cannot be obtained when the gaseous electric discharge is generated with the power of 300 w, if the discharge gap DG exceeds 0.5 mm. Similarly, a sufficient result of the surface treatment cannot be obtained when the gaseous electric discharge is generated with the power of 400 w, if the discharge gap DG exceeds 0.6 mm, and when with the power of 550 w, if exceeding 0.7 mm. These results mean that the electric discharge state can be changed significantly even if the discharge gap DG changes by 0.1 mm order.

Moreover, when the surface moves relative to the electric discharge generation portion 4a (4b), the electric discharge state at a certain position depends on an electric discharge state at such a position which is adjacent to the certain position and where the gaseous electric discharge starts immediately before the certain position.

Figure 6:
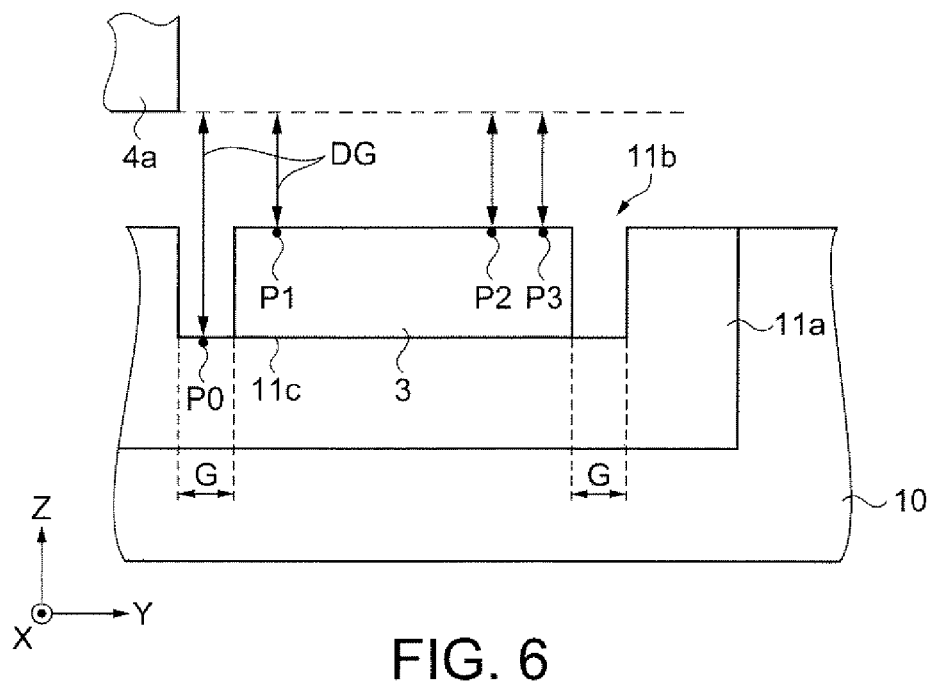
FIG. 6 is a diagram explaining a relation between a pallet and a substrate.

This is explained specifically with reference to FIG. 6. In FIG. 6, a distance between a position P1 and the electric discharge generation portion 4a (4b) is equal to a distance between a position P3 and the electric discharge generation portion 4a (4b). Here, when the electric discharge generation portion 4a (4b) moves relatively from left to right of FIG. 6, a position P0 is a position which is adjacent to the position P1 and where the gaseous electric discharge starts immediately before the position P1. Similarly, a position P2 is a position which is adjacent to the position P3 and where the gaseous electric discharge starts immediately before the position P3.

As shown in FIG. 6, the position P0 is a position on a bottom portion 11c exposed in the gap G. The position P2 is a position on the surface of the substrate 3. That is, a distance between the position P0 and the electric discharge generation portion 4a (4b) is different from a distance between the position P2 and the electric discharge generation portion 4a (4b). Specifically, there is a difference corresponding to the thickness TL of the substrate 3 between the two distances. Therefore, the electric discharge state at the position P0 is different from the electric discharge state at the position P2. Since, the electric discharge states of the positions P0 and P2 are different from each other, the electric discharge state of the position P1 is different from the electric discharge state of the position P3. Further, such a difference of electric discharge states on the substrate 3 is one reason of generating unevenness in processing in the case of the one-way treatment.

However, when the electric discharge generation portion 4a (4b) moves relatively from right to left of FIG. 6, the electric discharge state at the position P1 is replaced with the electric discharge state at the position P3, in comparison with the relative movement from left to right. A reason for this is because a shape of the recess and project defined by the pallet 11 and the substrate 3 is approximately symmetry with respect to an axis (X axis) perpendicular to the relative movement direction. Accordingly, if the two-way process is conducted as the embodiment, excess and deficiency of the electric discharge state at each position on the substrate 3 are compensated, unevenness in processing in the relative movement direction is reduced.

Furthermore, since the two-way process is conducted in the surface treatment method of the embodiment, even if the speed of the relative movement is low, the sufficient result of the surface treatment can be obtained as compared to in the case of the one-way treatment, as described in the following.

Figure 7A:
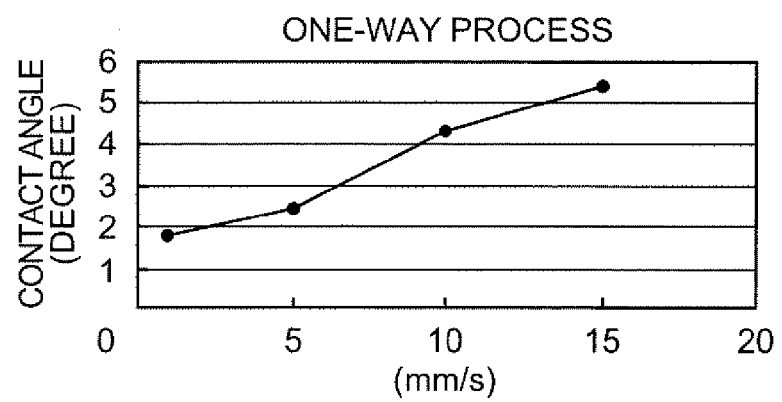
FIG. 7A is a graph showing a relation between processing speed and contact angles corresponding to a case of a one-way treatment.
Figure 7B:
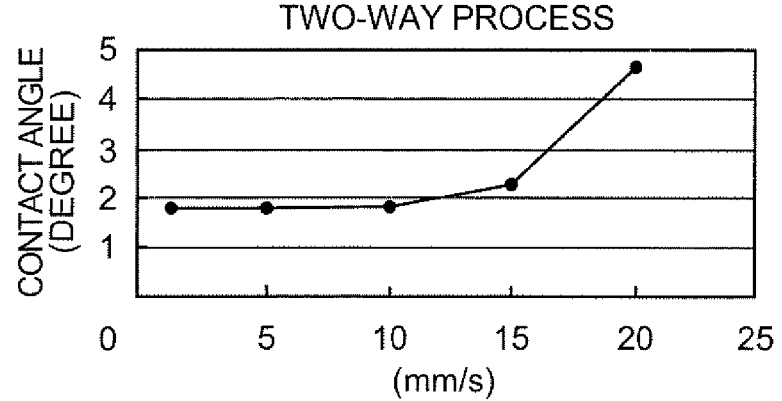
FIG. 7B is a graph showing a relation between processing speed and contact angles corresponding to a case of a two-way treatment.

FIG. 7A is a graph showing a relation between the relative movement speed and the contact angle in the case of the one-way treatment. Here, in order that the functional liquid containing the alignment film material wettably spreads on the surface, the contact angle of functional liquid on the surface is preferably 2 degrees or less. In the case of the one-way treatment, as shown in FIG. 7A, the relative movement speed is approximately proportional to the contact angle. Therefore, if the relative movement speed is reduced, the contact angle is reduced. Reducing the contact angle means that wettability with respect to the functional liquid is improved. That is, if the relative movement speed of the substrate 3 is reduced, wettability is more improved.

However, in the case of the one-way treatment, as shown in FIG. 7A, the relative movement speed of about 3 mm/s or less is necessary in order to attain the contact angle of 2 degrees or less. Here, if the relative movement speed is 3 mm/s or less, the plasma treatment apparatus 1 may not operate in a stable zone. For example, in some cases, it may be difficult to maintain the relative movement speed of the stage 10 constant.

On the other hand, in the case of the two-way process, in order to attain the contact angle of 2 degrees or less, the relative movement speed needs only to be 12 mm/s or less. Further, the contact angle converges on a certain lower limit value at a certain relative movement speed or less. As described above, since the relative movement speed can be relatively high in order to obtain the contact angle of a predetermined value or less, the plasma treatment apparatus 1 can operate in a stable zone. For example, it becomes easy to control to maintain the relative movement speed of the stage 10 constant.

Modified Example 1

The two-way process of the embodiment is attained by a set of the relative movements forward and backward. However, the two-way process may be attained by two or more sets of the relative movements forward and backward. It is because the effect explained in the embodiment is obtained if the number of times the substrate 3 moves relatively forward is the same as the number of times the substrate 3 moves relatively backward. Further, it is preferable the absolute values of the speeds of the relative movements forward and backward are the same on relative movement.

However, when a shape of the recess and project defined by the pallet 11 and the substrate 3 is not symmetry with respect to the axis (X axis) perpendicular to the relative movement direction, the number of times of moving relatively forward and the number of times of moving relatively backward may be changed properly.

Modified Example 2

The embodiment of the invention is applied to the surface treatment using the plasma treatment apparatus of "direct type" in the embodiment, but may be applied to the surface treatment using the plasma treatment apparatus of "indirect type". Here, the plasma treatment apparatus of "Indirect type" means an apparatus having a construction in which a surface to be processed is supplied with the plasma generated by the gaseous electric discharge between a pair of electrodes positioning separated from the surface. However, different from such an "indirect type", in an apparatus of "direct type" in the embodiment, irregularity (recess and project) of the surface facing the electric discharge generation portion 4a (4b) tends to affect the electric discharge state. Accordingly, the effect of reducing unevenness in processing appears significantly in a case that the embodiment of the invention is applied to the surface treatment using the plasma treatment apparatus of "direct type", compared to a case of not being applied.

Modified Example 3

In the embodiment, the surface treatment described above is conducted as a pre-processing for a process of forming an alignment film of the liquid crystal display device. An alignment film is a solid film (one layer film). However, the surface treatment method of the embodiment of the invention may be utilized as a pre-processing for a process of forming a functional film divided into plural sections, as well as a pre-processing for a process of forming a solid film. For example, the above-referenced method can be applied to a pre-processing for the case of providing a color filter element to a color filter substrate. Similarly, the above-referenced method can be applied to a pre-processing for the case of providing plural light emitting layers to an organic electroluminescence display device, and for the case of providing a fluorescent layer to plasma display device.

Furthermore, a thickness of the functional film, and/or a manner of molecule alignment in the functional film can be uniform across the entire surfaces of the substrates 3 whether the functional film is a solid film or a functional film divided into plural sections described above, if the surface treatment method of the embodiment of the invention is applied. Specifically, if a functional film to be formed is a color filter element (colored layer), a color filter substrate with less color unevenness can be obtained by utilizing the embodiment of the invention. If a functional film to be formed is a light emitting layer or a fluorescent layer, an organic electroluminescence display device or a plasma display device with less brightness irregularity can be obtained.

Here, in the present specification, a liquid crystal display device, an organic electroluminescence display device, a plasma display device, a surface-electron emitting display (SED), and a field emission display (FED) are referred to as "electro-optical devices", respectively. In other words, an "electro-optical device" refers to all kinds of display device devices that project, emit, transmit or reflect light upon application of a signal voltage, not limited to devices which utilize changes in optical characteristics (so-called electro-optical effects), such as birefringence change, optical rotation change and light scattering change.

As described above, the surface treatment method of the embodiment of the invention may be realized as a manufacturing method of a color filter substrate, and as a manufacturing method of an electro-optical device.

Modified Example 4

In the embodiment, the surface treatment method of the embodiment of the invention is realized as a process of imparting affinity with liquid to the surface of the functional liquid. However, in place of this mode, the above-referenced method may be realized as a process of imparting liquid repellency to the surface of the functional liquid. Further, the above-referenced method may be realized as a process of washing the surface by plasma. The above-referenced method may be still further realized as a process of exposing a pixel electrode of an organic electroluminescence display device to plasma, and adjusting the work function of the pixel electrode.

What is claimed is:

1. A surface treatment method using a plasma treatment apparatus which has an electric discharge generation portion facing a surface of a substrate with a gap therebetween, the substrate being placed on a supporting body, and a construction in which the gap is supplied with a treatment gas that contains oxygen, the method comprising:

applying different voltages between the electric discharge generation portion and the supporting body such that plasma is obtained from the treatment gas supplied to the gap;

moving one of the electric discharge generation portion and the substrate relative to the other in a first direction, while the surface of the substrate is being exposed to the plasma;

moving, after the relative movement in the first direction and the exposure above-referenced, one of the electric discharge generation portion and the substrate relative to the other in a second direction opposite to the first direction, while the surface of the substrate is being exposed to the plasma; and exposing the substrate to atmospheric air between the process of the relative movement in the first direction and the exposure and the process of the relative movement in the second direction and the exposure.

2. The method of claim 1 wherein the relative movement in the first and second directions is continued from when the surface of the substrate enters a shadow area obtained by projecting the plasma treatment apparatus on the supporting body along the X axis direction until the surface of the substrate exits from the shadow area completely.

* * * * *